(12) United States Patent
Hijikata et al.

(10) Patent No.: US 10,524,315 B2
(45) Date of Patent: Dec. 31, 2019

(54) ELECTROMAGNETIC COOKER

(71) Applicant: ADX CO., LTD., Aichi (JP)

(72) Inventors: Tomoharu Hijikata, Aichi (JP); Takayuki Fujita, Aichi (JP)

(73) Assignee: ADX CO., LTD., Aichi (JP)

( * ) Notice: Subject to any disclaimer, the term of this patent is extended or adjusted under 35 U.S.C. 154(b) by 308 days.

(21) Appl. No.: 15/611,885

(22) Filed: Jun. 2, 2017

(65) Prior Publication Data

US 2017/0353997 A1    Dec. 7, 2017

(30) Foreign Application Priority Data

Jun. 7, 2016  (JP) .................................. 2016-113311

(51) Int. Cl.
| | | |
|---|---|---|
| H05B 6/12 | (2006.01) | |
| H05B 6/06 | (2006.01) | |
| A47J 27/00 | (2006.01) | |
| A47J 27/02 | (2006.01) | |

(52) U.S. Cl.
CPC .......... *H05B 6/1272* (2013.01); *A47J 27/004* (2013.01); *A47J 27/02* (2013.01); *H05B 6/1236* (2013.01)

(58) Field of Classification Search
CPC ...... H05B 6/1236; H05B 6/1272; A47J 27/02; A47J 27/004
USPC ....... 219/620–622, 624, 626, 627, 605, 385; 219/675, 677; 99/451, 422, DIG. 14, 99/DIG. 13; 340/870.17, 870.31, 870.39; 220/573.1, 592.22
See application file for complete search history.

(56) References Cited

U.S. PATENT DOCUMENTS

| 3,742,178 A | * | 6/1973 | Harnden, Jr. | ......... | A47J 27/002 |
|---|---|---|---|---|---|
| | | | | | 219/385 |
| 9,307,862 B2 | * | 4/2016 | Roever | ................ | H05B 6/1245 |

FOREIGN PATENT DOCUMENTS

| JP | S62-298318 A | | 12/1987 |
|---|---|---|---|
| JP | H08-322715 A | | 12/1996 |
| JP | 2007244648 A | * | 9/2007 |
| JP | 2014-113229 A | | 6/2014 |
| JP | 2015-159101 A | | 9/2015 |

OTHER PUBLICATIONS

Translation of JP2007244648A, Fujiwara, Kenji, Electric Rice Cooker, Sep. 27, 2007, Dialog.Solutions (Year: 2007).*

* cited by examiner

*Primary Examiner* — Quang T Van
(74) *Attorney, Agent, or Firm* — Maier & Maier, PLLC

(57) ABSTRACT

An electromagnetic cooker includes: a plane section that faces a bottom face part of a cooking pot when the cooking pot is placed; a frame body section that is erected from the plane section and houses the cooking pot to face a side face part of the cooking pot when the cooking pot is placed; a first heating section that is provided in the plane section and heats the bottom face part of the cooking pot by an induction heating method; and a second heating section that is provided in the frame body section and heats the side face part of the cooking pot by a method different from the induction heating method.

3 Claims, 5 Drawing Sheets

ELECTROMAGNETIC COOKER

CROSS-REFERENCE TO RELATED APPLICATION

This application claims the Conventional priority based on Japanese Patent Application No. 2016-113311 filed on Jun. 7, 2016, the contents of which are incorporated by reference herein in its entirety.

BACKGROUND OF THE INVENTION

Field of the Invention

This disclosure relates to an electromagnetic cooker for placing and heating a cooking pot.

Description of the Related Art

Conventionally, as an apparatus for performing cooking with heat by using a cooking pot, a thin type flat plate-like electromagnetic cooker (also referred to as an IH cooker) is known (for example, Japanese Patent Laid-Open No. 2015-159101).

SUMMARY OF THE INVENTION

In a case where rice is cooked by use of a pot, heat can be uniformly transferred to a hemispherical whole bottom of the pot, and therefore rice is favorably cooked compared to a general cooking pot having a flat bottom. On the other hand, a conventionally general electromagnetic cooker described in Japanese Patent Laid-Open No. 2015-159101 has a structure in which a cooking pot is placed on a flat plate-like heating section, and heats only a bottom face of the cooking pot, and therefore heat is difficult to uniformly transfer to the cooking pot. Even in a case where the general cooking pot having the flat bottom is used, it is desirable that heat can be more uniformly transferred from an electromagnetic cooker to the cooking pot.

This disclosure has been made in view of such a problem, and an object of the disclosure is to provide an electromagnetic cooker capable of more uniformly transferring heat to a cooking pot.

In order to solve the above problem, an electromagnetic cooker according to this disclosure is an electromagnetic cooker for placing and heating a cooking pot, which includes: a plane section that faces a bottom face part of the cooking pot when the cooking pot is placed; a frame body section that is erected from the plane section and houses the cooking pot to face a side face part of the cooking pot when the cooking pot is placed; a first heating section that is provided in the plane section and heats a bottom face part of the cooking pot by an induction heating method; and a second heating section that is provided in the frame body section and heats the side face part of the cooking pot by a method different from the induction heating method.

In the above electromagnetic cooker, the second heating section preferably heats the cooking pot by heat generation of a heating wire disposed so as to circle along a peripheral direction of the side face part of the cooking pot, when the cooking pot is placed.

In the above electromagnetic cooker, when the cooking pot is placed, the heating wire of the second heating section is preferably disposed in a portion of the side face part of the cooking pot, the portion being on a side close to the bottom face part.

In the above electromagnetic cooker, the frame body section preferably has: an inner frame that forms an inner peripheral surface of the frame body section; an outer frame that forms an outer peripheral surface of the frame body section; and a frame structure that is disposed between the inner frame and the outer frame and supports the inner frame and the outer frame.

In the above electromagnetic cooker, the frame body section preferably has: an upper frame that is formed so as to surround whole ends of the inner frame, the outer frame, and the frame structure at an end on a side opposite to a side on which the frame body section is connected to the plane section; a recess that is provided in the frame structure and is formed so as to be recessed on an inner peripheral surface side along a peripheral direction of the outer peripheral surface of the frame structure; and a fixing means for fixing the frame structure and the upper frame in the recess.

DETAILED DESCRIPTION OF THE PREFERRED EMBODIMENT

Figure 1:
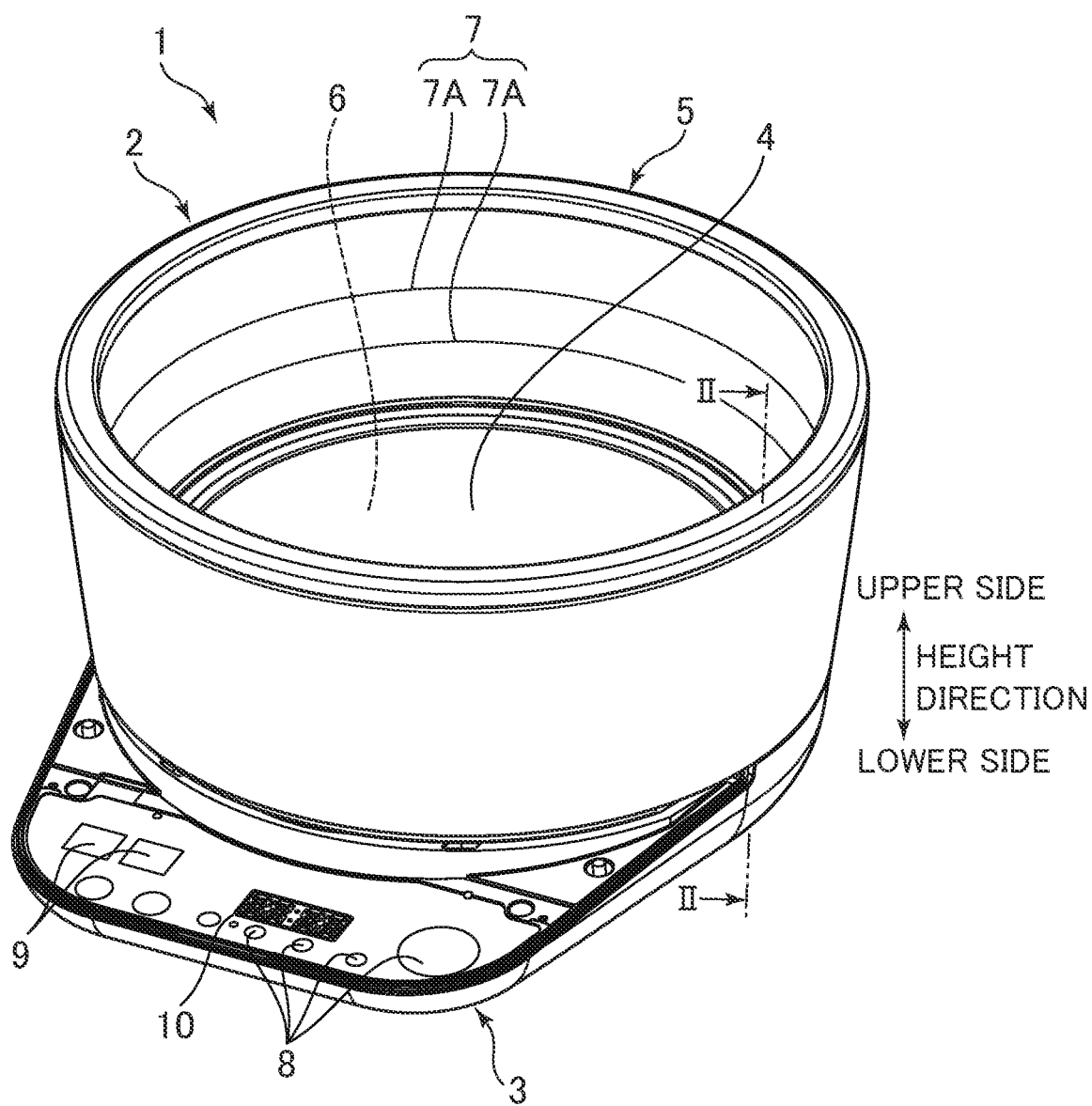
FIG. 1 is a perspective view illustrating a schematic configuration of an electromagnetic cooker according to an embodiment.

Hereinafter, an embodiment of the present invention will be described with reference to the attached drawings. In order to facilitate understanding of the description, the same components in the drawings are denoted by the same reference numerals as much as possible, and overlapped descriptions will be omitted. In the following description, the upward direction of FIG. 1 is expressed as the upper side in the height direction in a state where an electromagnetic cooker 1 is installed on a working table or the like, and the downward direction of FIG. 1 is expressed as the lower side in the height direction.

This disclosure is not limited by these specific examples. These specific examples with a suitable design change added by a person skilled in the art are also within the scope of this disclosure as long as they have the features of the present disclosure. The components included in the above respective specific examples, and the placement, conditions, shapes, and the like of these components are not limited to the exemplified ones, but can be suitably changed. The combination of the respective components included in the above specific examples can be suitably changed unless technical inconsistency occurs.

The electromagnetic cooker 1 is an apparatus for placing and heating a cooking pot 20. The cooking pot 20 that is an object to be heated by the electromagnetic cooker 1 has a substantially columnar shape including a bottom face part 20A and a side face part 20B, and is made of, for example, cast iron (refer to FIG. 2). The electromagnetic cooker 1 can be configured as a single apparatus which can be driven by, for example, a domestic power source. The electromagnetic cooker 1 of this embodiment is configured so as to surround the bottom face part 20A and the side face part 20B of the cooking pot 20 to heat the bottom face part 20A and the side face part 20B together, when the cooking pot 20 is placed. As illustrated in FIG. 1, the electromagnetic cooker 1 includes a main body section 2 and an operation section 3.

Figure 2:
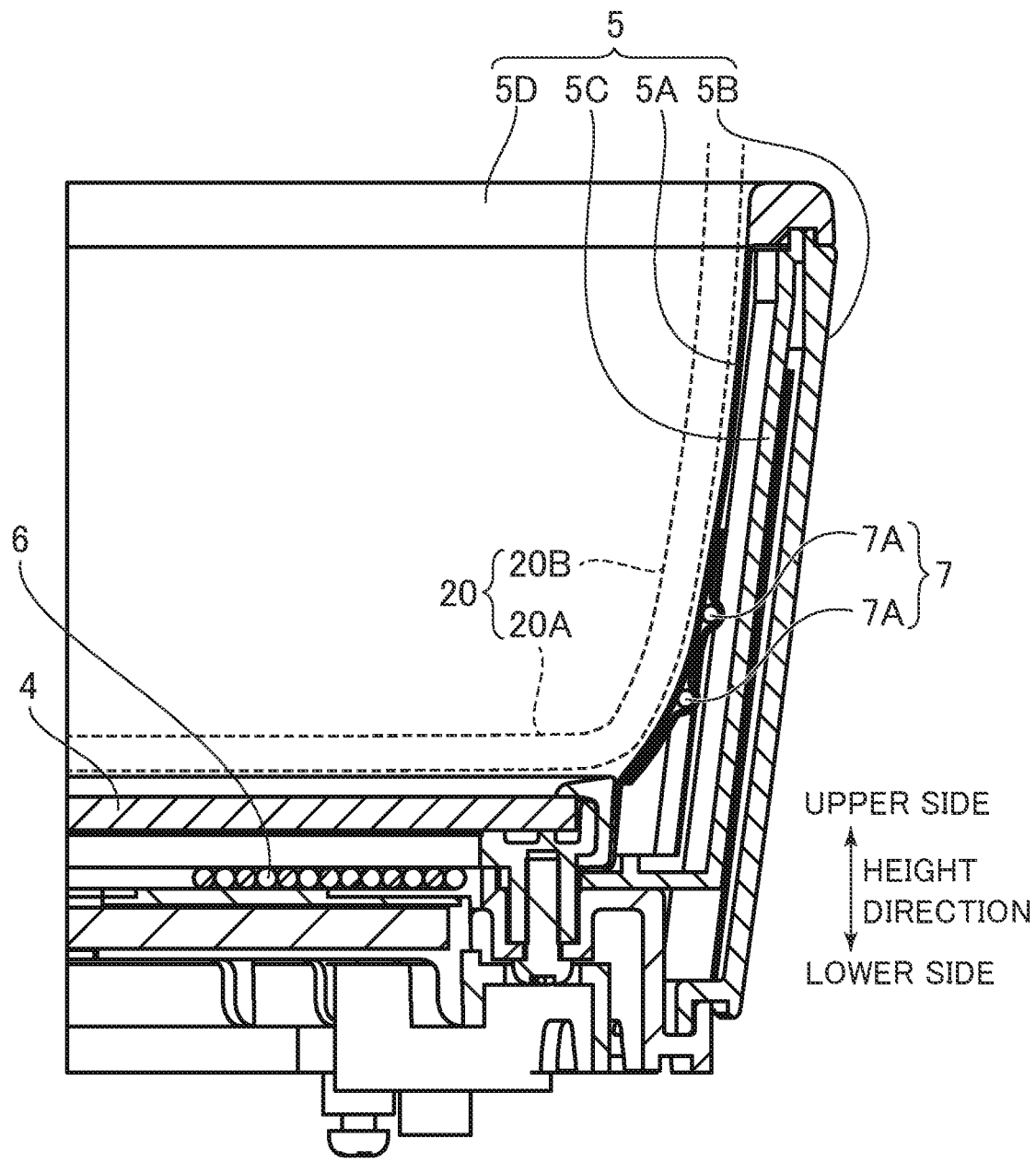
FIG. 2 is a II-II sectional view of a main body section in FIG. 1 and FIG. 3.

The main body section 2 is a portion that houses and heats the cooking pot 20 as an object to be heated. As illustrated in FIG. 1 and FIG. 2, the main body section 2 has a housing space formed corresponding to a shape of the cooking pot 20, and is configured so as to house the cooking pot 20 in this housing space from an opening on the upper side in the height direction. The main body section 2 includes a plane section 4 and a frame body section 5. The plane section 4 is a flat plate-like member disposed on the lower side in the height direction of the main body section 2 and is a portion facing the bottom face part 20A of the cooking pot 20 when the cooking pot 20 is placed. A principal plane on the upper side in the height direction of the plane section 4 serves as a bottom face of the housing space for the cooking pot 20 by the main body section 2. The frame body section 5 is erected from the plane section 4 on the upper side in the height direction and is a portion that houses the cooking pot 20 and faces the side face part 20B of the cooking pot 20 when the cooking pot 20 is placed. The frame body section 5 is a substantially cylindrical member. An inner peripheral surface of the frame body section 5 serves as a side face of the housing space for the cooking pot 20 by the main body section 2.

As illustrated in FIG. 2 to FIG. 5, the frame body section 5 is configured by integrally assembling an inner frame 5A, an outer frame 5B, a frame structure 5C, and an upper frame 5D. The inner frame 5A and the outer frame 5B are substantially cylindrical members and are disposed concentrically to the central axis of the cylindrical shape of the frame body section 5. The inner frame 5A forms the inner peripheral surface of the frame body section 5, and the outer frame 5B forms an outer peripheral surface of the frame body section 5. The inner frame 5A of the main body section 2 is made of metal such as an aluminum material, and the outer frame 5B of the main body section 2 is made of, for example, a resin.

The frame structure 5C is disposed between the inner frame 5A and the outer frame 5B and is a member incorporated in the frame body section 5. The frame structure 5C is configured so as to hold the inner frame 5A and the outer frame 5B at an end on the upper side in the height direction. The inner frame 5A, the outer frame 5B, and the frame structure 5C are directly fixed to the plane section 4 at ends on the lower side in the height direction, or fixed to the plane section 4 through other structure supporting these. Thus, the frame structure 5C for supporting the inner frame 5A and the outer frame 5B is incorporated inside the frame body section 5, so that it is possible to reduce the outer diameter (i.e., the product outer diameter) of the frame body section 5, and thin the frame body section 5.

The upper frame 5D is an annular member, and is connected to ends on the upper side in the height direction of the inner frame 5A, the outer frame 5B, and the frame structure 5C. As illustrated in FIG. 1 and FIG. 2, the upper frame 5D is formed so as to surround the whole ends on the upper side in the height direction (side opposite to a side on which the frame body section 5 is connected to the plane section 4) of the inner frame 5A, the outer frame 5B, and the frame structure 5C. That is, the upper frame 5D forms a verge section on the opening side of the frame body section 5.

Figure 3:
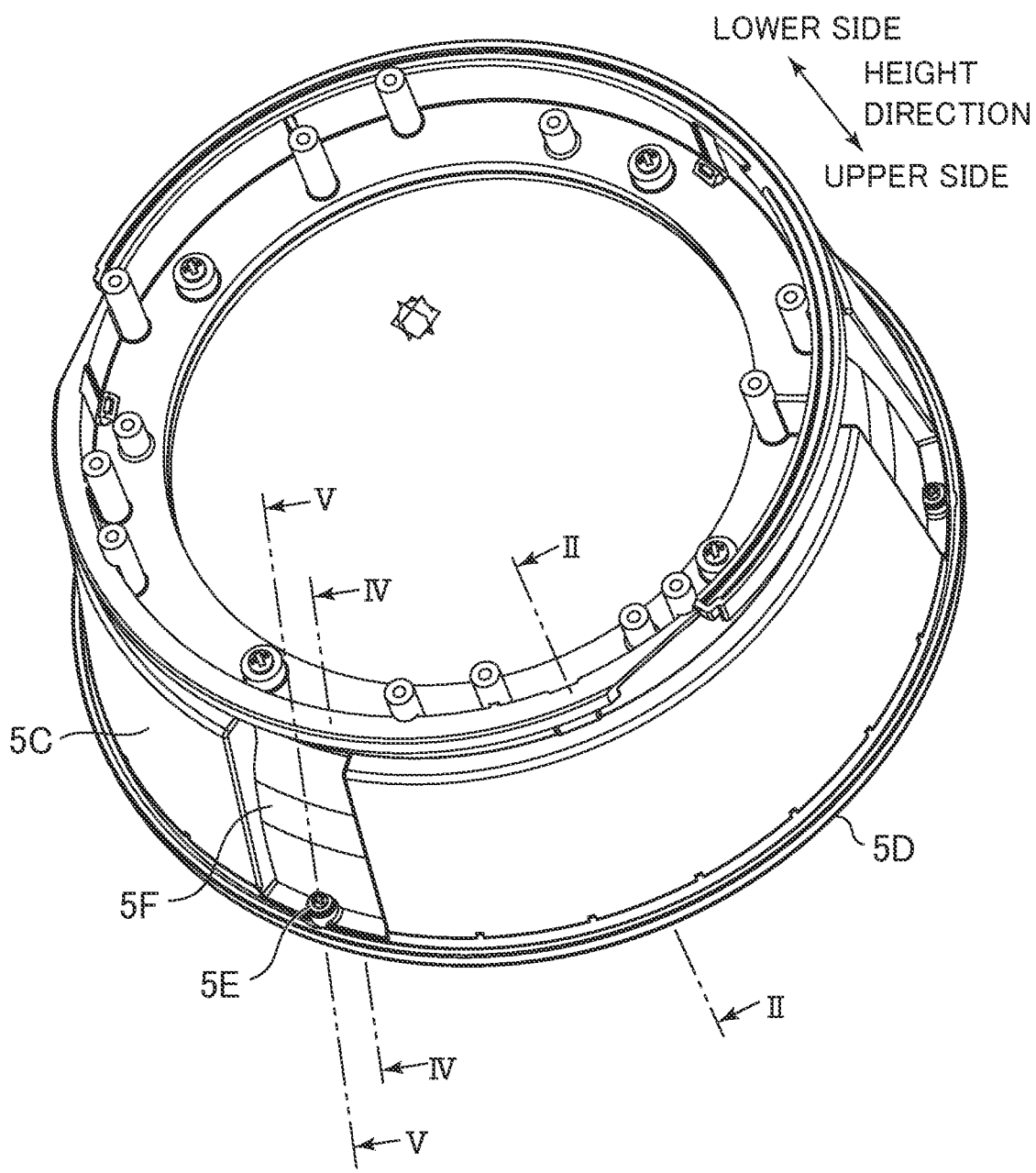
FIG. 3 is a perspective view illustrating an internal shape of the frame body section in FIG. 1.
Figure 4:
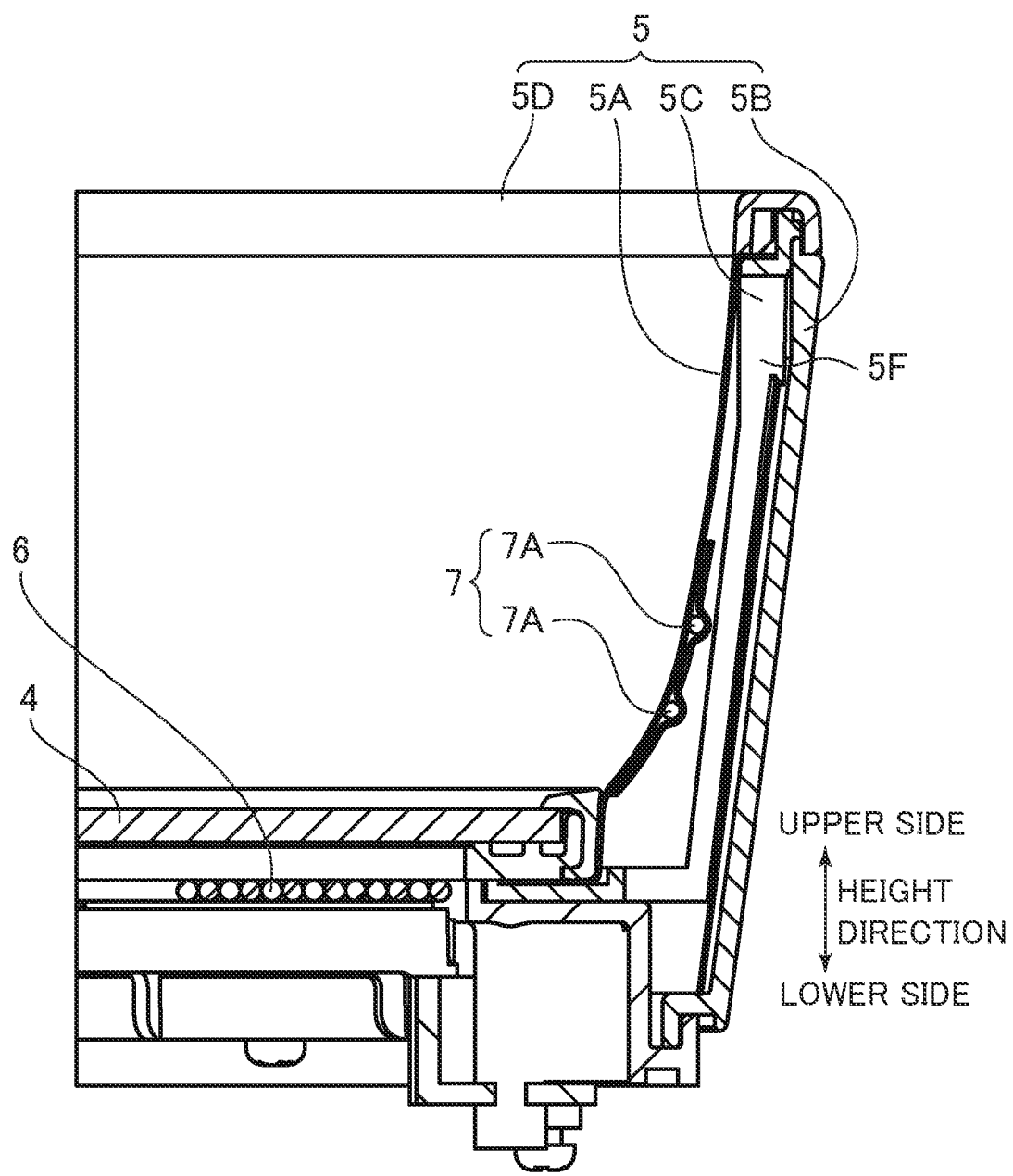
FIG. 4 is a sectional view of the main body section, taken along a IV-IV sectional line in FIG. 3.
Figure 5:
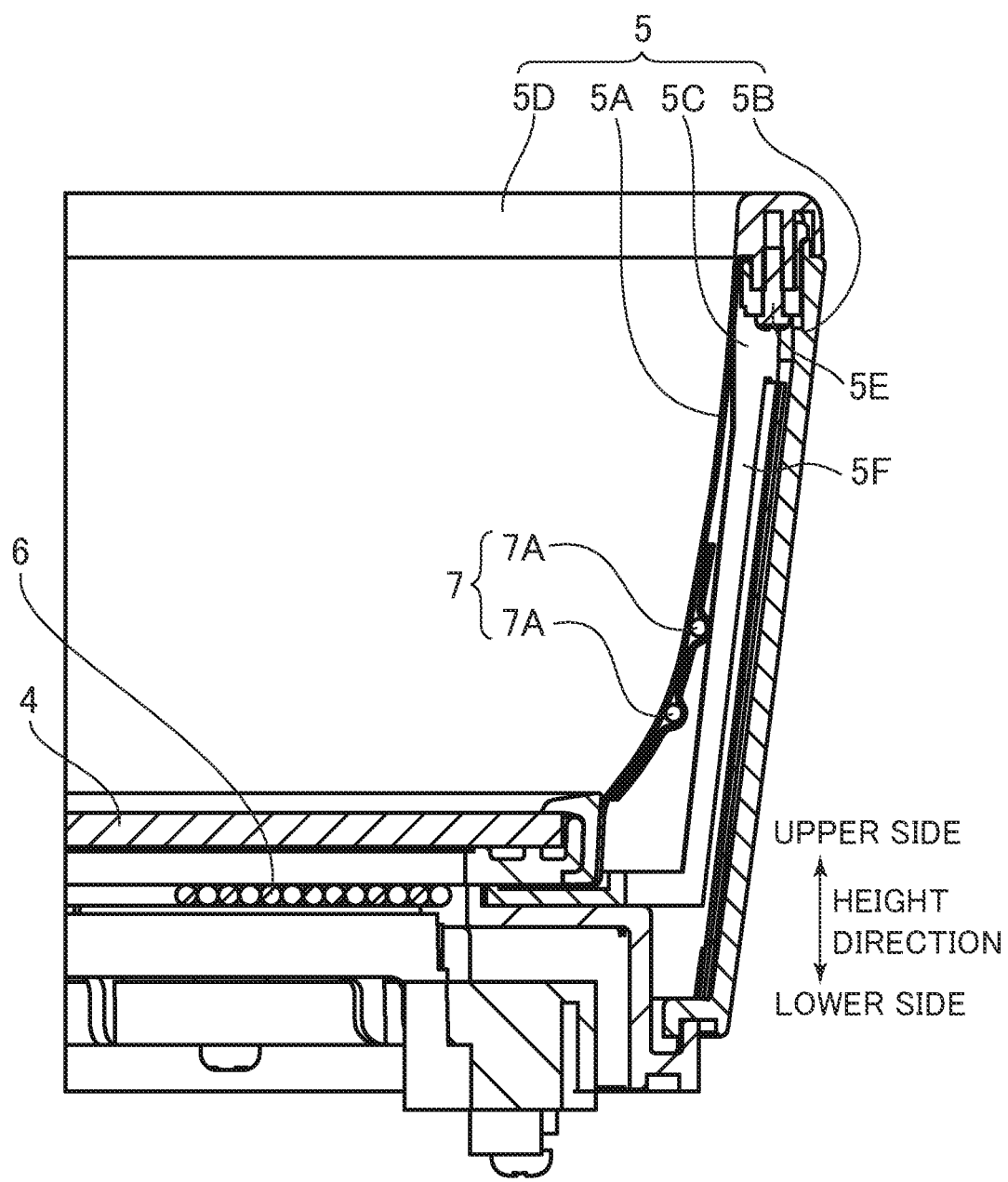
FIG. 5 is a sectional view of the main body section, taken along a V-V sectional line in FIG. 3.

As illustrated in FIG. 3 and FIG. 5, the upper frame 5D is connected and fixed to the frame structure 5C by tightening, for example, screws 5E (fixing means). In this embodiment, as illustrated in FIG. 3 and FIG. 5, the frame structure 5C is formed with a plurality of recesses 5F recessed on the inner peripheral surface side along the peripheral direction of the outer peripheral surface, and a space for tightening the screw 5E is provided in each of the recesses 5F. Consequently, respective portions for tightening the screws 5E do not need to protrude on the inner peripheral surface side or the outer peripheral surface side of the frame structure 5C, and therefore it is possible to thin the frame body section 5, and reduce the apparatus size. As illustrated in FIG. 2, FIG. 4, and FIG. 5, the upper frame 5D is fitted to the inner frame 5A and the outer frame 5B held by the frame structure 5C. The frame structure 5C and the upper frame 5D only need to be fixed to each other, and can be fixed to each other by a fixing means other than screw tightening.

While the whole of the upper frame 5D is made of metal, an outer half of a top face (end face on the upper side in the height direction) which is easily touched by a user is made of a resin, so that the user can be unlikely to feel heat even when the user touches the upper frame during operation of the electromagnetic cooker 1. Additionally, a rubber material or a resin material is attached to an inner half of the top face of the upper frame 5D, so that the cooking pot can be made difficult to damage when the cooking pot is put in and out of the main body section 2.

The plane section 4 is provided with an IH (Induction Heating) coil 6 (first heating section). The IH coil 6 can heat the bottom face part of the cooking pot facing the plane section 4, by an induction heating method.

The inner frame 5A of the frame body section 5 is provided with a side heater 7 (second heating section). The side heater 7 heats the side face part of the cooking pot facing the inner peripheral surface of the frame body section 5, by heat generation of heating wires 7A disposed so as to circle along the peripheral direction of the side face part of the cooking pot when the cooking pot is placed. When the cooking pot is placed, the heating wires 7A of the side heater 7 are preferably disposed in a portion of the side face part of the cooking pot, the portion being on a side close to the bottom face part. In this embodiment, as illustrated in FIG. 1 and FIG. 2, the two heating wires 7A of the side heater 7 are disposed at a position on the plane section 4 side with respect to an intermediate position in the height direction of the frame body section 5. The two heating wires 7A are each formed annularly along the inner peripheral surface of the frame body section 5 and are disposed apart at an equal interval in the height direction.

The operation section 3 controls cooking with heat by the electromagnetic cooker 1, more specifically, inputs and outputs information for controlling operation of the IH coil 6 and the side heater 7. The operation section 3 includes a plurality of buttons 8 as an input means for receiving an operation command from a user of the electromagnetic cooker 1. Each button 8 includes, for example, an LED incorporated therein, and can urge the user to perform operation input by, for example, lighting only the button 8 which is a button to be operated for a necessary operation.

The operation section 3 includes a plurality of display sections 9 and a 7-segment display 10 as output means for presenting information to a user. Each display section 9 can display predetermined information by lighting previously printed letters, numerals, marks, and the like by use of a light source such as an LED. The 7-segment display 10 is a display device in which seven segments capable of individually lighting on/off are configured as one set, and can display a single numeral of Arabic numerals for each set by selectively lighting each segment. Each segment of the 7-segment display 10 is also configured so as to emit light by use of a light source such as an LED, similarly to the display sections 9. Both the display sections 9 and the 7-segment display 10 are configured so as to uniformly light letters and segments by use of a resin reflector.

The 7-segment display 10 is formed from a component different from the operation section 3. The operation section 3 and the 7-segment display 10 are individually manufactured, and thereafter the 7-segment display 10 is mounted on a predetermined region of the operation section 3, so that both are integrally configured. In the 7-segment display 10, light sources and a light emitting mechanism are downsized compared to other light emitting elements of the operation section 3 such as the buttons 8 and the display sections 9. Consequently, downsizing of the operation section 3 is attained.

A control device (not illustrated) is incorporated in the electromagnetic cooker 1. The control device controls cooking with heat by the electromagnetic cooker 1, more specifically, controls operation of the IH coil 6 and the side heater 7, and input/output of the operation section 3.

In the electromagnetic cooker 1 configured as described above, when an operation command is input from a user through the operation section 3 in a state where the cooking pot 20 is placed on the main body section 2, display of the operation section 3, and operation of the IH coil 6 and the side heater 7 are controlled by the control device in response to the operation command, so that it is possible to perform suitable operation according to a procedure of cooking with heat by the cooking pot 20.

Now, effects of the electromagnetic cooker 1 according to this embodiment will be described. The electromagnetic cooker 1 of this embodiment includes the plane section 4 that faces the bottom face part 20A of the cooking pot 20 when the cooking pot 20 is placed; the frame body section 5 that is erected from the plane section 4 and houses the cooking pot 20 to face the side face part 20B of the cooking pot 20 when the cooking pot 20 is placed; the IH coil 6 that is provided in the plane section 4 and heats the bottom face part 20A of the cooking pot 20 by an induction heating method; and the side heater 7 that is provided in the frame body section 5 and heats the side face part 20B of the cooking pot 20 by heat generation of the heating wires 7A disposed so as to circle along the peripheral direction of the side face part 20B of the cooking pot 20 when the cooking pot 20 is placed.

A conventional flat plate-like IH cooker and the like mainly heat only the bottom face part 20A of the placed cooking pot 20, and therefore are difficult to uniformly transfer heat to the cooking pot 20. On the contrary, with the above configuration, the electromagnetic cooker 1 of this embodiment can further heat the side face part 20B of the cooking pot 20 by use of the side heater 7, in addition to heating of the bottom face part 20A of the cooking pot 20 by use of the IH coil 6. Consequently, compared to the conventionally flat plate-like IH cooker, heat can be more uniformly transferred to the cooking pot 20. Furthermore, the bottom face part 20A of the cooking pot 20 is heated by the IH coil 6, and the side face part 20B is heated by the side heater 7, and therefore heating control of the bottom face part 20A of the cooking pot 20, and heating control of the side face part 20B can be individually performed, and more delicate heating control is possible.

Furthermore, the electromagnetic cooker 1 of this embodiment includes the frame body section 5 that surrounds the cooking pot 20, and therefore an exposed portion of the cooking pot 20 during cooking with heat can be reduced compared to the conventional flat plate-like IH cooker. Consequently, it is possible to suitably prevent the cooking pot 20 from being cooled during cooking with heat due to, for example, influence of conditioned air and the like in a room where the electromagnetic cooker 1 is utilized, and therefore it is possible to avoid a situation where heat quantity is insufficient to cause failure of cooking particularly when cooking is performed on a low heat, and it is possible to stabilize a finish status of low heat cooking.

In the electromagnetic cooker 1 of this embodiment, when the cooking pot 20 is placed, the heating wires 7A of the side heater 7 are preferably disposed on a portion of the side face part 20B of the cooking pot 20, the portion being on a side close to the bottom face part 20A (i.e., portion on the plane section 4 side). With this configuration, it is possible to suitably generate a temperature difference between the bottom side and the opening side inside the cooking pot 20, and it is possible to facilitate generation of heat convection, and therefore it is possible to more favorably perform cooking with heat by the cooking pot 20.

Thus, the embodiment of the present invention is described with reference to the specific example. However, the present invention is not limited to theses specific examples. That is, these specific examples with suitable design change added by a person skilled in the art are also within the scope of this disclosure as long as they include the features of the present invention. For example, the components included in the above respective specific examples, and the placement, material, conditions, shape, size, and the like of these components are not limited to the exemplified ones, but can be suitably changed. The combination of the respective components included in the above specific examples can be suitably changed unless technical inconsistency occurs, and combination of these is also within the scope of this disclosure as long as they include the features of the present invention.

In the embodiment, the side heater 7 is applied as a component that heats the side face part 20B of the cooking pot 20, and heating is performed by heat generation of the heating wires 7A. However, means for heating the side face part 20B of the cooking pot 20 may have a configuration other than the above, as long as a method different from the induction heating method like the IH coil 6 is employed.

What is claimed is:

1. An electromagnetic cooker for placing and heating a cooking pot, the electromagnetic cooker comprising:
    a plane section that faces a bottom face part of the cooking pot when the cooking pot is placed;
    a frame body section that is erected from the plane section and houses the cooking pot to face a side face part of the cooking pot when the cooking pot is placed;
    a first heating section that is provided in the plane section and heats the bottom face part of the cooking pot by an induction heating method; and
    a second heating section that is provided in the frame body section and heats the side face part of the cooking pot by a method different from the induction heating method, wherein the frame body section has:
    an inner frame that forms an inner peripheral surface of the frame body section;
    an outer frame that forms an outer peripheral surface of the frame body section;
    a frame structure that is disposed between the inner frame and the outer frame and supports the inner frame and the outer frame;

an upper frame that is formed so as to surround whole ends of the inner frame, the outer frame, and the frame structure at an end on a side opposite to a side on which the frame body section is connected to the plane section;

a recess that is provided in the frame structure, and is formed so as to be recessed on an inner peripheral surface side along a peripheral direction of the outer peripheral surface of the frame structure; and a fixing means for fixing the frame structure and the upper frame in the recess.

2. The electromagnetic cooker according to claim 1, wherein the second heating section heats the cooking pot by heat generation of a heating wire disposed so as to circle along a peripheral direction of the side face part of the cooking pot, when the cooking pot is placed.

3. The electromagnetic cooker according to claim 2, wherein when the cooking pot is placed, the heating wire of the second heating section is disposed in a portion of the side face part of the cooking pot, the portion being on a side close to the bottom face part.

\* \* \* \* \*